United States Patent
Looker

[15] 3,640,055
[45] Feb. 8, 1972

[54] CORN HARVESTER WITH TRASH BLOWER

[72] Inventor: Olin L. Looker, Milford, Ill.
[73] Assignee: FMC Corporation, San Jose, Calif.
[22] Filed: Aug. 29, 1969
[21] Appl. No.: 854,227

[52] U.S. Cl. .............................................56/106, 56/12.8
[51] Int. Cl. .............................................A01d 45/02
[58] Field of Search ...................56/18, 106, 12.8; 130/5; 209/134–137, 143; 98/40

[56] References Cited

UNITED STATES PATENTS

| | | | |
|---|---|---|---|
| 2,399,740 | 5/1946 | Hyman | 56/18 |
| 3,004,277 | 10/1961 | Allred | 98/40 X |
| 3,096,604 | 7/1963 | Baker et al. | 56/18 |

FOREIGN PATENTS OR APPLICATIONS

135,717  6/1960  U.S.S.R. .....................56/18

Primary Examiner—Louis G. Mancene
Assistant Examiner—J. N. Eskovitz
Attorney—F. W. Anderson and C. E. Tripp

[57] ABSTRACT

A corn harvester particularly adapted for harvesting market corn has two picker heads which deliver severed ears to a takeaway conveyor. Slide panels project upwardly and outwardly from the sides of the conveyor and a specially constructed blower is disposed above the conveyor and the picker heads for directing streams of air laterally. As the crop slides down the slide panels it is cleaned of trash with counterflowing streams of air. The blower has superposed fans with front, rear, top and bottom inlets and louvered side outlets.

4 Claims, 10 Drawing Figures

FIG_5

FIG_8

FIG_6

FIG_7

CORN HARVESTER WITH TRASH BLOWER

SUMMARY OF THE INVENTION

In the field harvesting of fresh market corn, it is important that the crop be clear of trash such as corn stalk leaves or segments, stalk segments, etc. Conventional corn harvesters carry at least two picker heads for traversing the rows and these heads include stalk guides, snapping rolls and severed ear conveyors which drop the severed ears onto a crop or takeaway conveyor for later disposal by the harvester. Because of the stalk severing action taking place in the picker heads, a certain amount of trash such as leaf and stalk fragments may be deposited by the picker heads onto the takeaway conveyor. Under the present invention this loose trash is blown from the crop immediately after it has left the picker heads.

Although the space for a blower is quite limited, under the present invention an effective blower which will deliver relatively large, laterally directed streams of air, can be placed over the takeaway conveyor and between the delivery throats of the picker heads. Also provided under the present invention are slide panels at each side of the conveyor just downstream of the delivery heads and facing the blower. As the crop drops from the picker head throats toward the conveyor, it slides down along the slide panels and receives directed laterally directed streams of air. These streams are guided by the slide panels and hence flow counter to the dropping motion of the severed ears as they are deposited on those panels. These counterflow streams of air pick up loose trash of the type referred to above and blows it clear of the harvester before it is carried to the remainder of the machine by the takeaway conveyor.

Under the present invention the blower is specially constructed to provide free breathing and even though it occupies a restricted space. This is accomplished by a double blower and partition construction in conjunction with superposed fan blades. Air can enter the fan blades from the front and the rear as well as from above and below. Side louvers are arranged to direct the streams of air leaving the fan blades into lateral flow, as previously described.

DETAILED DESCRIPTION

A two-row corn harvester of the type selected to illustrate an embodiment of the present invention is described in detail in my copending U.S. application, Ser. No. 675,467, filed Oct. 16, 1967, now U.S. Pat. No. 3,499,272, issued Mar. 10, 1970 and assigned to the FMC Corporation. The trash blower B of the present invention is specially positioned with respect to the picker heads and the takeaway or crop conveyor, but the details of these and other elements of the harvester are not critical to the invention and hence will be described only briefly. Reference can be made to my aforesaid copending application for such design details, but it will be apparent that except for the physical relation of the picker heads to the conveyor, other harvesters having two picker heads of the conventional type can also be modified to embody the present invention.

Figure 1:
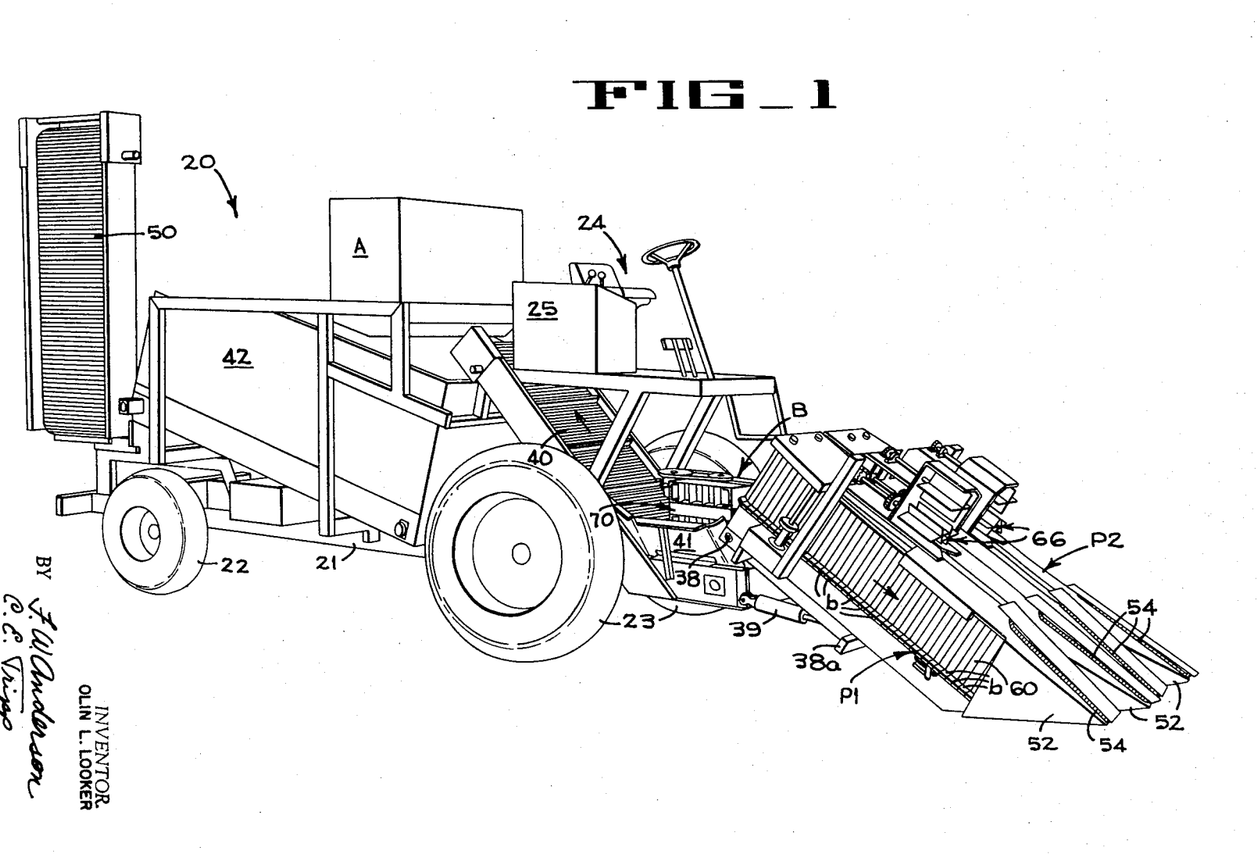
FIG. 1 is a perspective of a two-row harvester embodying the present invention.
Figure 2:
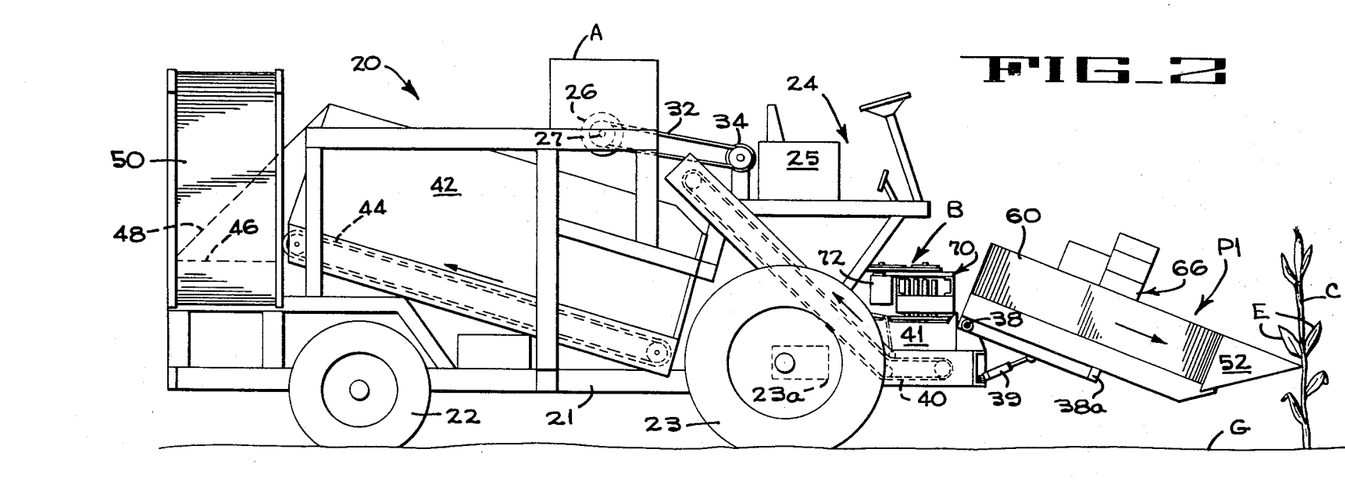
FIG. 2 is a side view of the harvester.

The harvesting machine 20 (FIGS. 1–3) includes a frame 21 supported by steerable rear wheels 22 and is driven by powered front wheels 23. An operator at a control station 24 manipulates hydraulic controls at a console 25 which govern various power mechanisms, later mentioned, that derive hydraulic power from a main pump 26 (FIG. 3) driven by the shaft 27 of an engine A.

Figure 3:
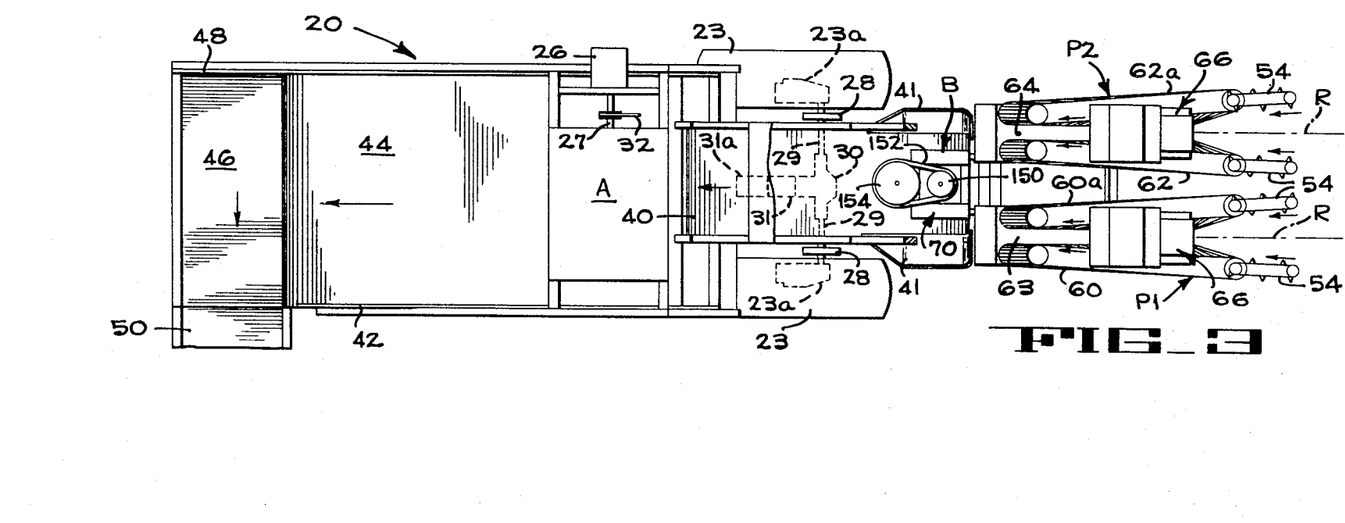
FIG. 3 is a plan view of the harvester with parts broken away.

As shown diagrammatically in FIG. 3, the wheels 23 each have a gear reduction hub 23a which is coupled, through a brake 28, and an axle 29 to a differential unit 30. Transmission assembly 31 is mechanically coupled to the differential and is driven by a hydraulic motor 31a which is hydraulically connected to controls at the console 25. In order to drive the hydraulic motor 31a for the transmission, a V-belt and pulley unit 32 is connected to the shaft 27 (FIG. 3) of engine A, and to the shaft of a hydraulic pump 34 (FIG. 2) for the transmission motor 31a.

Mounted on the front of the harvesting machine 20 are laterally spaced picking heads P1 and P2, each head being arranged to straddle a row of cornstalks C that lie along the centerlines R (FIG. 3). The picking heads can be pivoted upward, about a common horizontal pivot axis at 38 (FIG. 2) by energizing a double-acting hydraulic cylinder 39 and an identical cylinder, not shown, at the other side of the machine. The picking heads are interconnected by a tie bar 38a so as to move simultaneously about their common pivot axis. The piston rods of the cylinders 39 can be locked in intermediate positions to regulate the height of the free ends of the picking heads from the ground line G when the harvesting machine is in operation.

Continuing with the general description of the harvesting machine 20, the picking heads P1 and P2 function when the machine is driven along the rows of stalks, to pull the stalks downward onto the ground, while the ears E are severed from the stalks and conveyed rearwardly within the picking head. Each picking head discharges the harvested ears E along a path indicated generally at E1 (FIG. 6) onto the level inlet end of a takeaway or crop conveyor 40. Guide panels 41 at each side of the conveyor 40 act as slide plates to guide the ears down onto the conveyor (See FIG. 5).

Figure 5:
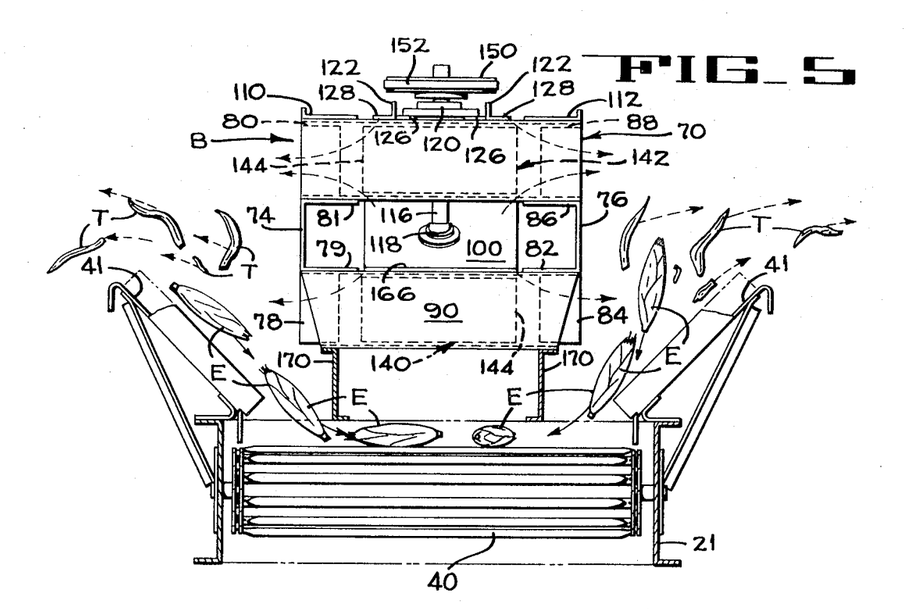
FIG. 5 is a section taken on line 5—5 of FIG. 4.

In accordance with the present invention, laterally directed air blasts from the blower B impinge on the ears at the slide panels 41. Both panels are tilted outward, as shown in FIG. 5, so that loose foliage and all other trash material lighter than the ears is blown up and over the panels onto the ground. After extending a short distance rearwardly, the conveyor 40 moves upwardly under the control station 24 (FIG. 2) and discharges the ears along into a hopper 42.

The bottom of the hopper comprises an endless slat-type conveyor 44 that discharges the ears onto a cross conveyor 46. Conveyor 46 is masked off at the left side of the machine by a wall 48 and delivers the ears to the right side of the machine. Pivotally connected to the machine frame and aligned with the cross conveyor 46 is an elevator conveyor 50, (FIGS. 1 and 2) here illustrated in its upright position, that is used when the harvesting machine is moved to and from the cornfield. In a harvesting operation, the elevator conveyor 50 is inclined so as to discharge the ears into an attendant truck or wagon moved along with the harvesting machine.

The picking heads P1 and P2, and the conveyors 40, 44, 46 and 50 are each driven by individual hydraulic motors (only the motor for the picking head P1 being shown) which are hydraulically connected to the pump 26, by connectors not shown, these being details not essential to the present invention.

With more detailed reference to the structure of the picking heads P1 and P2 employed in the harvester embodying the present invention, each head has cooperating right and left sections comprising lead-in nose plates 52 and gathering chains 54. Opposed ear conveyors 60, 60a and 62, 62a are also provided (FIG. 3), which conveyors may have moving lower butt stops b (FIG. 6) as claimed in my aforesaid copending application.

Figure 4:
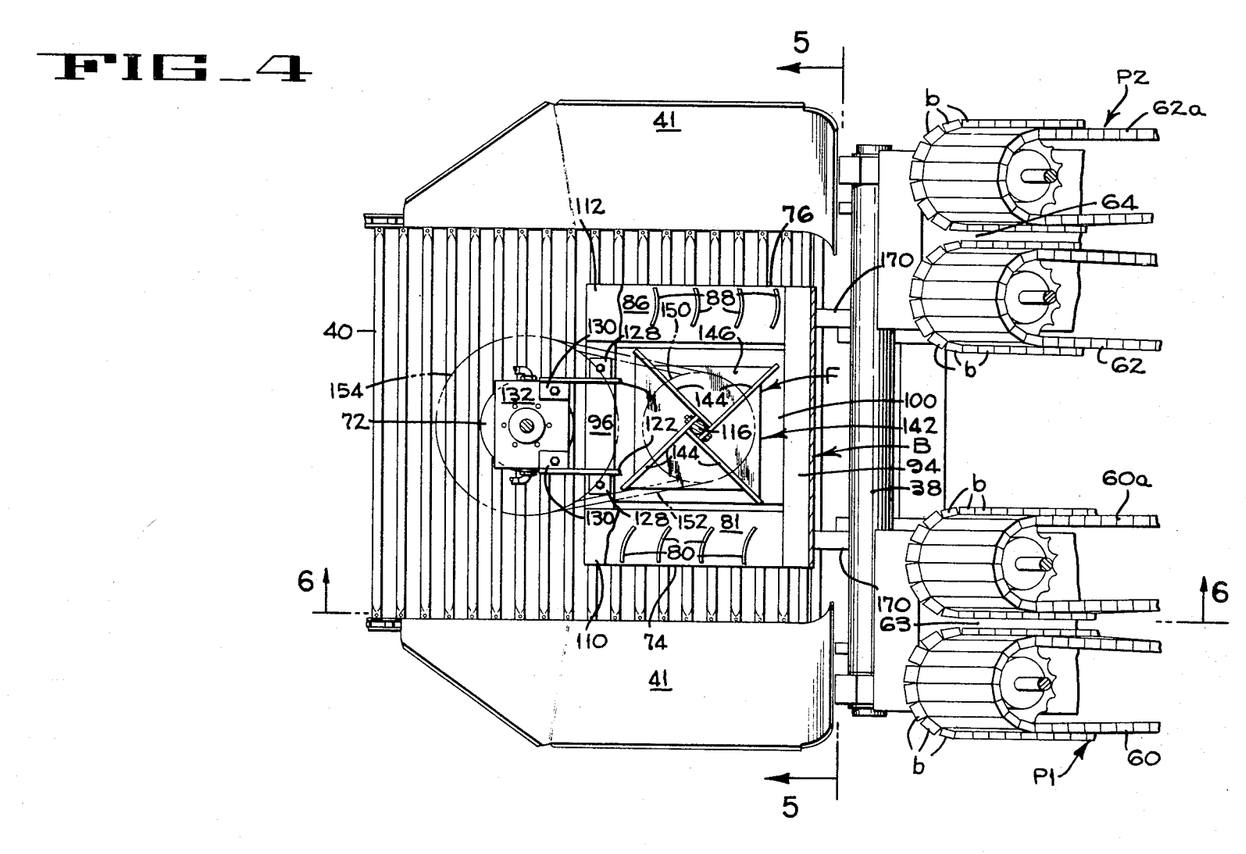
FIG. 4 is an enlarged fragmentary plan of the harvester at the blower installation.

The ear conveyors of the picker heads provide severed ear delivery throats 63, 64 (FIGS. 3 and 4) which deliver the ears to the conveyor 40 between the blower B and the slide plates 41.

Below the entrance section of the ear conveyors are the conventional snapping rolls for pulling down on the cornstalks and severing the ears therefrom. One snapping roll 65 of the picking head P1 appears in FIG. 6 but since these elements are conventional and their details not critical to the present invention, their construction and drive mechanisms are not illustrated. A suitable snapping roll assembly and drive is described in my aforesaid pending application.

A stalk ejector rotor assembly 66 is shown mounted above the ear conveyors, but the details of this construction are not critical to the present invention. The stalk ejector clears the picker heads of several stalks and some leaves, but not completely enough to obviate the advantages of the final cleaning action performed by the blower B under the present invention. A complete example of a suitable stalk ejector drive and construction is given in my aforesaid copending application.

BLOWER CONSTRUCTION

Having described the general construction of a harvester embodying the present invention, including the relation of the blower to the picker heads, takeaway conveyor and slide plates at the side of that conveyor for cleaning the severed ears of trash, a detailed description of a preferred blower construction will now be presented.

Referring to FIGS. 7-10, the blower B includes a housing indicated generally at 70. A tandem fan indicated generally at F is driven by a hydraulic motor 72 (FIGS. 6 and 8) operated by the usual connections (not shown) from the main hydraulic pump (FIG. 3). Although only limited space is available for the blower mounting (see FIGS. 3 and 4), the blower housing and fan are constructed so that powerful, laterally directed blasts of air are generated. This results from a free breathing construction wherein the blower has front, rear, bottom and top air inlets to the fan. This compact, free breathing and high delivery construction is facilitated by the housing and tandem fan construction which, in effect, divides the blower into two sections, each of which has two inlets and two laterally directed outlets, these sections being superposed.

The blower housing is made up of sheet metal parts bent and assembled to provide the four inlets and four outlets previously described, in the following manner.

Figure 7:
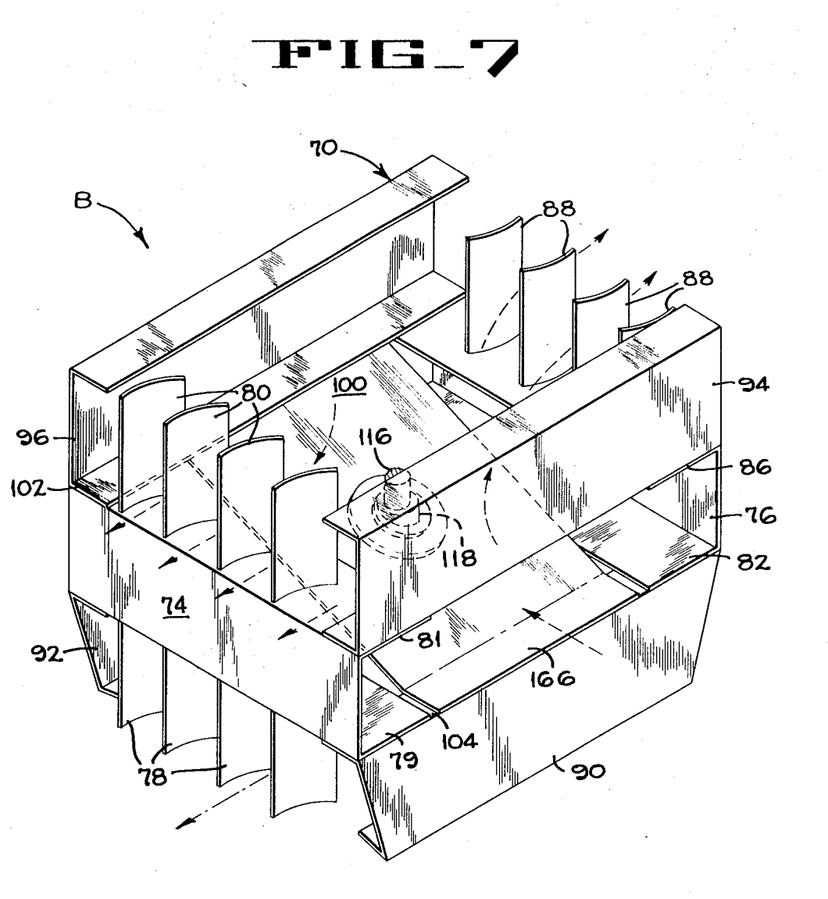
FIG. 7 is a perspective of housing elements of the blower construction.
Figure 10:
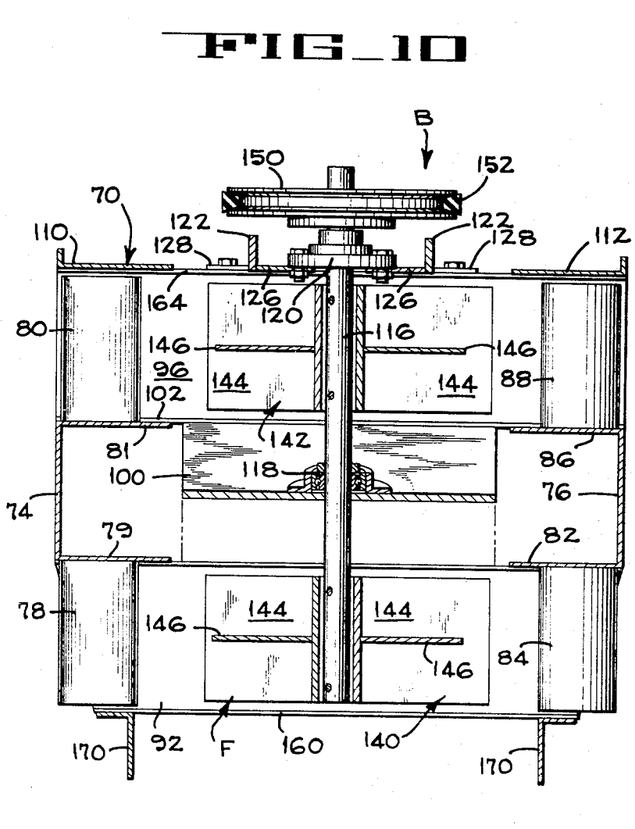
FIG. 10 is a section taken on line 10—10 of FIG. 9.

The blower has opposed side louver mounting channels 74, 76 to which are welded downwardly and upwardly projecting curved louvers. For example, the channel 74 has four downwardly projecting louvers 78 welded to the flange 79 of the channel and four upwardly projecting louvers 80 welded to the upper flange 81 of the channel (FIGS. 7 and 10).

Similarly, the channel 76 has welded to its lower flange 82 (FIG. 10) a set of downwardly projecting louvers 84 and projecting from the upper flange 86 of the channel is a set of upwardly projecting louvers 88. Thus the louvers 78, 80 on one side provide outlets for a laterally directed stream of air on one side of the lower housing and the louvers 84, 88 provide similar outlets on the other side of the housing.

A lower fan casing is provided by front and rear channels 90, 92 (FIGS. 7 and 8) spanning the louver channels 74, 76. Similarly an upper fan casing is formed by channels 94, 96. The two fan casings are vertically separated by an angled partition 100 which extends from the lower flange 102 of the upper cross channel 96 to the upper flange 104 of the lower cross channel 90. In the example given, the divider plate 100 forms an angle with the horizontal of about 22½°.

The bottom of the blower housing is substantially open but the top of the housing is partially closed by cover strips 110, 112 (FIGS. 9 and 10) running along each side of the housing. These cover strips assist in preventing the inadvertent falling of ears of corn or trash into the blower housing without functionally obstructing the upper air inlet to the housing.

Figure 8:
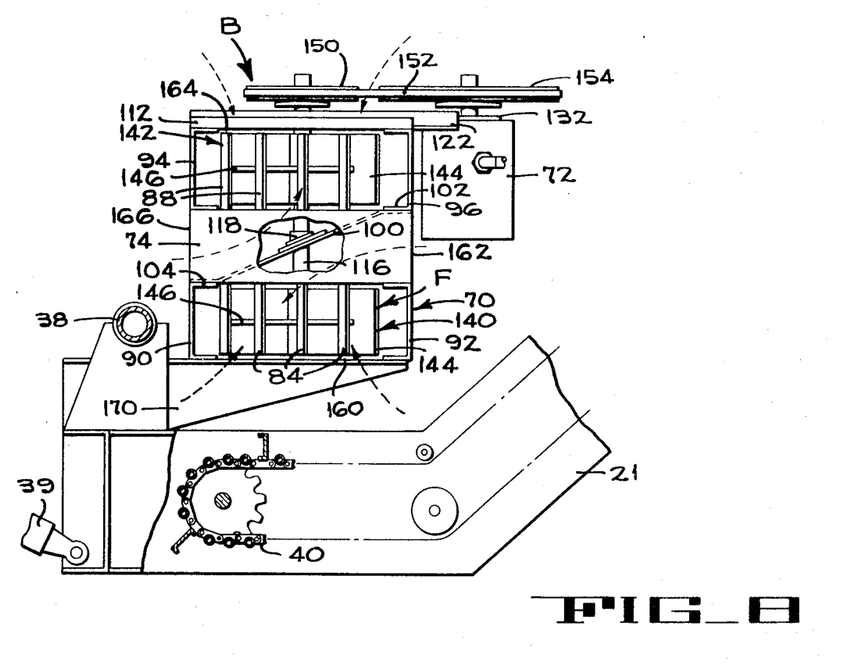
FIG. 8 is a side view of the blower assembly with parts broken away.
Figure 9:
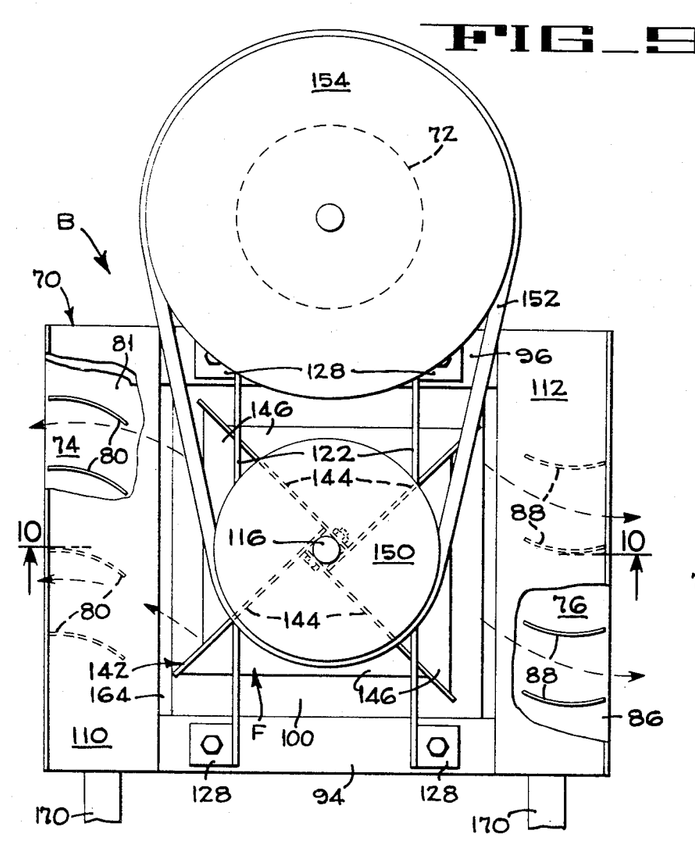
FIG. 9 is a plan of the blower assembly with parts broken away.

The fan F has a vertical shaft 116 which is mounted in a swivel bearing assembly 118 of conventional construction at the center of the divider plate 100 (FIG. 8 and 10). Another antifriction bearing 120 supports the fan shaft on longitudinal rails 122 that span the upper channels 94, 96 (FIG. 9). The rails have inwardly projecting tabs 126 for mounting the housing of the upper fan bearing 120. The rails 122, 124 are bolted to the front and rear channels 94, 96 by means of outwardly projecting tabs 128, as seen in FIG. 9. The rails 122 have rearward extensions which mount tabs 130 (FIG. 4) for adjustably supporting a plate 132 that mounts the hydraulic drive motor 72 for the fan, previously mentioned. As best seen in FIGS. 8 and 10, the tandem fan F has a lower section 140 and an upper section 142. These fan sections are substantially identical and are made up of four radial fan blades 144 bolted in staggered hub formation to the fan shaft 116 (FIG. 9). Triangular gusset plates 146 span the fan blades 144 as seen in FIGS. 9 and 10. The fan shaft 116 is driven by a pulley 150, a V-belt 152 and a motor pulley 154 on the shaft of the motor 72. Thus the blower housing provides a relatively open bottom air inlet 160 and a rearwardly facing air inlet 162 (FIG. 8) for the lower fan section 140. The lower louvers 78, 84 distribute streams of air in a lateral direction submitted through the inlets 160, 162 as impelled by the lower fan section 140.

The upper fan section 142 receives air from upper inlet 164 between the cover strips 110, 112 (FIG. 9) and through a front inlet 166 above the divider plate 100 (FIGS. 7 and 8).

As seen in FIG. 9, the louvers 86 are concave and in the example given are formed on a radius of about 3½ inches. As seen in FIG. 9, the concave faces of the respective louvers face the approaching fan blades and hence pick up the streams of air generated by the fan blades and redirect them so that they emerge from the blower housing in a substantially lateral direction.

The means for mounting the blower housing 70 above the conveyor 40 and between the delivery throats 63, 64 of the picker head is not critical to the present invention. In the harvester shown the blower is supported on brackets 170 (FIGS. 5 and 6) which project rearwardly from the framework supporting the tie bar 38.

To give some of the preferred dimensions of the illustrated preferred blower construction, the diameter of the rotor blades 144 when assembled is 14 inches and each of the fan sections 140, 142 is 4½ inches in height. The fan is driven at 2,270 r.p.m. The width of the housing 70 is 20 inches, its length along the longitudinal dimension of the corn harvester is 16 inches and the housing is about 16-inches high.

OPERATION

The operation of the harvester embodying the present invention has been briefly mentioned, but will be further explained in somewhat more detail.

Figure 6:
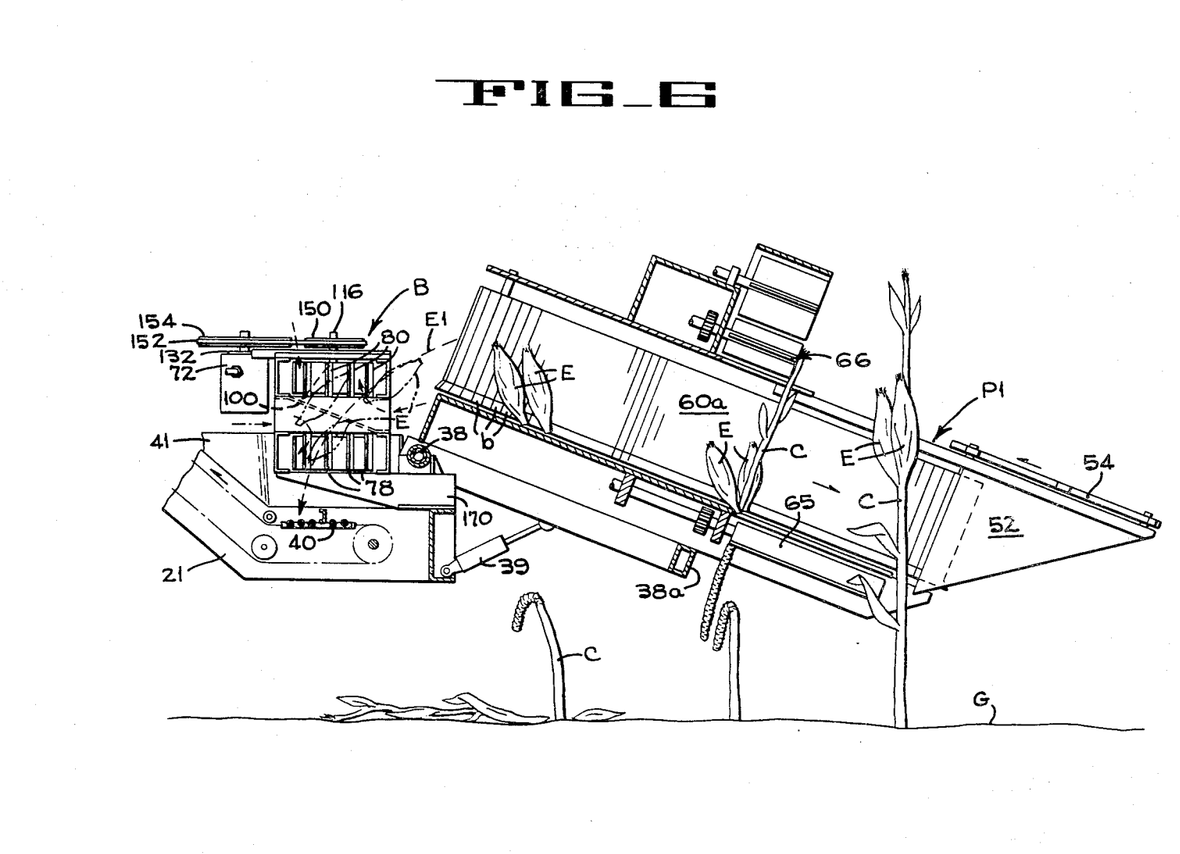
FIG. 6 is a section taken on line 6—6 of FIG. 4.

As the harvester of the present invention proceeds down the rows, cornstalks C pass between the gathering belts 54 and the pickup head conveyors, such as conveyors 60, 60a (FIG. 6). The corn stalks are gripped between the snapping rolls, one of which 65, is shown in FIG. 6. The rolls pull the ears downwardly against the moving butt stops b on the ear conveyors 60, 60a and the roll knives sever the ears from the stalks, all as described in detail in my copending application.

The severed ears are carried rearwardly by the picker conveyors 60, 60a, and 62, 62a whereupon they are delivered by the throats 63, 64 (FIGS. 3 and 4) and drop along the trajectory E1 (FIG. 6) between the slide plates 41 and the blower B (FIG. 5). As the ears fall along the slide plates 41 and in front of the respective side louvers of the blower they are subjected to the force of the laterally directed streams of air emanating from the blower, which blows leaves and trash away from the ears. In addition, a number of the ears fall on the slide plates 41 and slide down towards the conveyor 40 (FIG. 5). Ears partaking of this motion receive the cleaning effect of counterflow currents of air because the lateral air streams are directed upwardly by the deflecting and baffling action of the slide plates 41. The trash and leaves T (FIG. 5) thus blown clear of the ears continue on upwardly and outwardly clear of the harvester.

Thus it can be seen in accordance with the present invention, that although a limited space is available, above the conveyor and behind picker heads for the mounting of a blower, effective use of this space is made by a powerful, free breathing blower that directs oppositely flowing streams of air across the ears of corn being delivered by the picker heads. These streams of air are guided and deflected by slide plates for the ears which form counterflow air streams for effectively cleaning the trash from the ears and for blowing the trash out of the harvester.

Although the best mode contemplated for carrying out the present invention has been herein shown and described it will be apparent that modification and variation may be made without departing from what is regarded to be the subject matter of the invention as set forth in the appended claims.

What is claimed is:

1. A corn harvester comprising a pair of laterally spaced picking heads, said picker heads including paired conveyors for the severed ears and forming laterally spaced delivery throats, a rearwardly moving crop conveyor disposed below and spanning said paired conveyor delivery throats, crop slide panels projecting upwardly and outwardly from said crop conveyor at said delivery throats, and blower means disposed above said crop conveyor and between said delivery throats for directing streams of air laterally against the panels and up along the crop as it slides down slide panels to clean the sliding crop of trash with counterflow streams of air, said blower means comprising a housing having a forwardly inclined divider plate, a vertical shaft, a fan section on said shaft above and below said divider plate, means forming air inlet throats to both sides of said divider plate, air delivery throats having vertical louvers on each side of said fan sections, and fans in said fan sections.

2. The harvester of claim 1 wherein said louvers are concave with the concavities facing approaching blades of the fan sections.

3. The harvester of claim 1, wherein said housing is also open top and bottom to provide additional air inlets to said fan sections.

4. The harvester of claim 3, wherein fore and aft side cover strips partially cover the top of said fan housing for excluding ears of corn from the housing.

* * * * *